A. FREDERICKSON & N. NIELSEN.
FLAX AND GRASS SEED HARVESTER ATTACHMENT FOR MOWING MACHINES.
APPLICATION FILED JULY 26, 1912.
1,099,495.
Patented June 9, 1914.
5 SHEETS—SHEET 4.
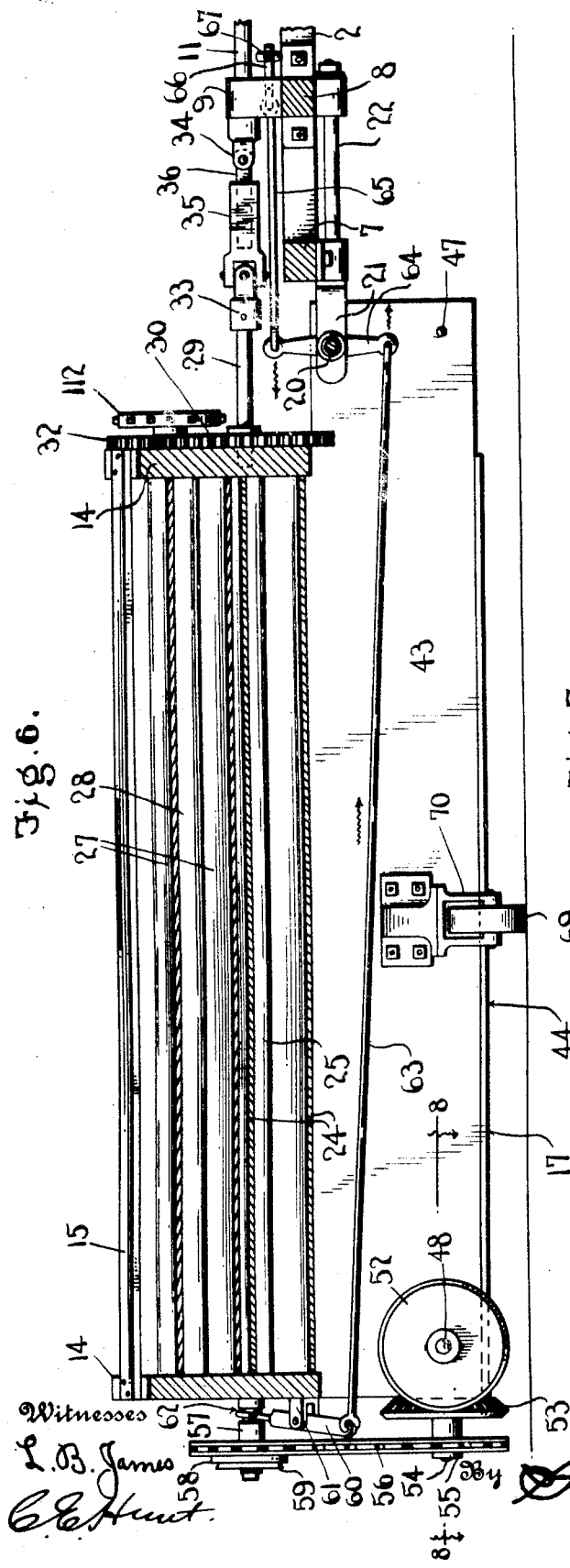
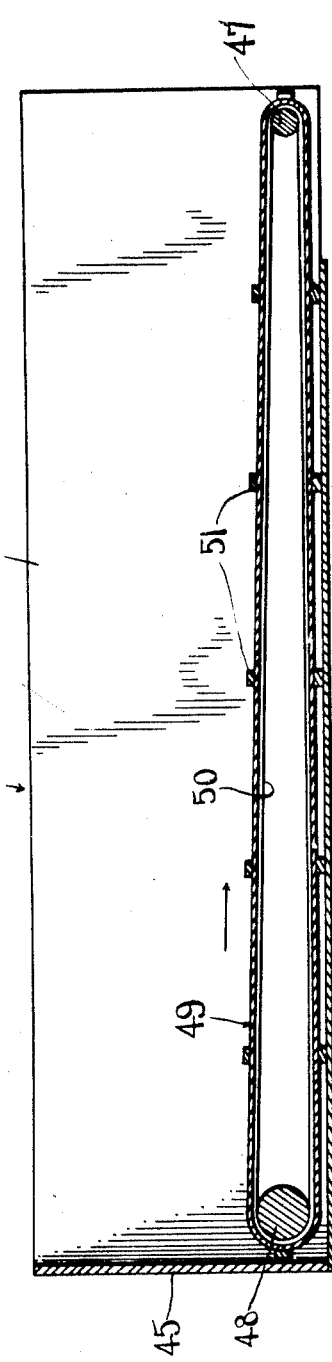
Inventors
Albert Frederickson &
Niels Nielsen

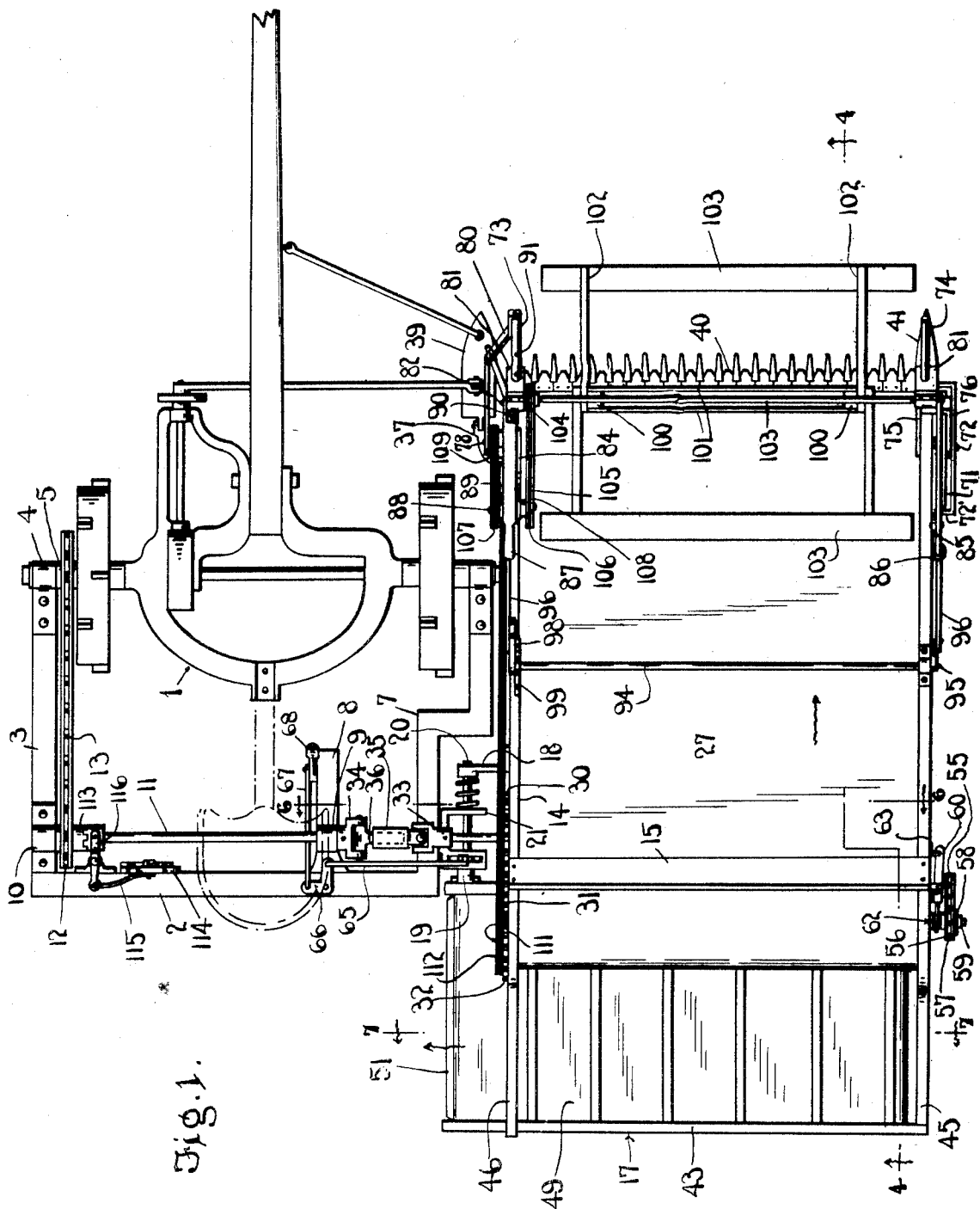

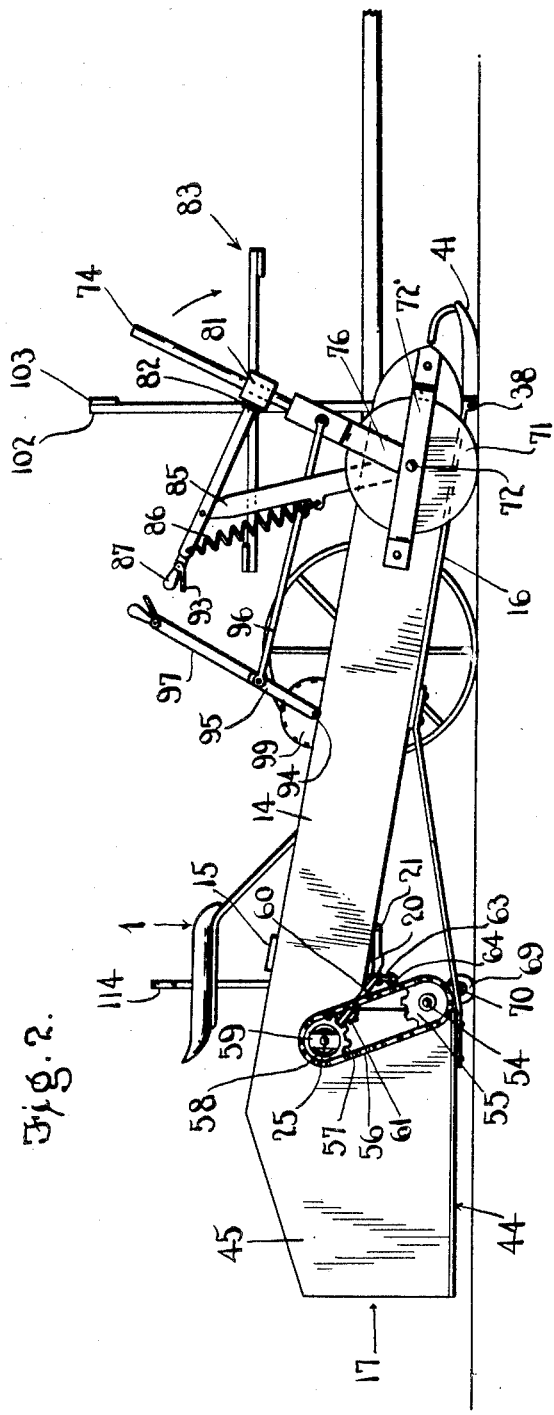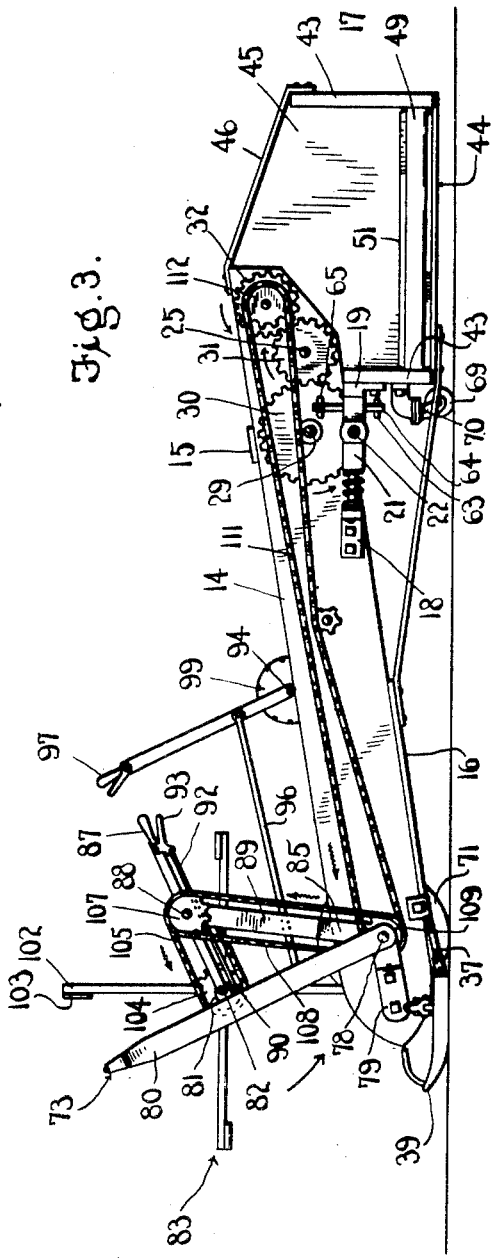

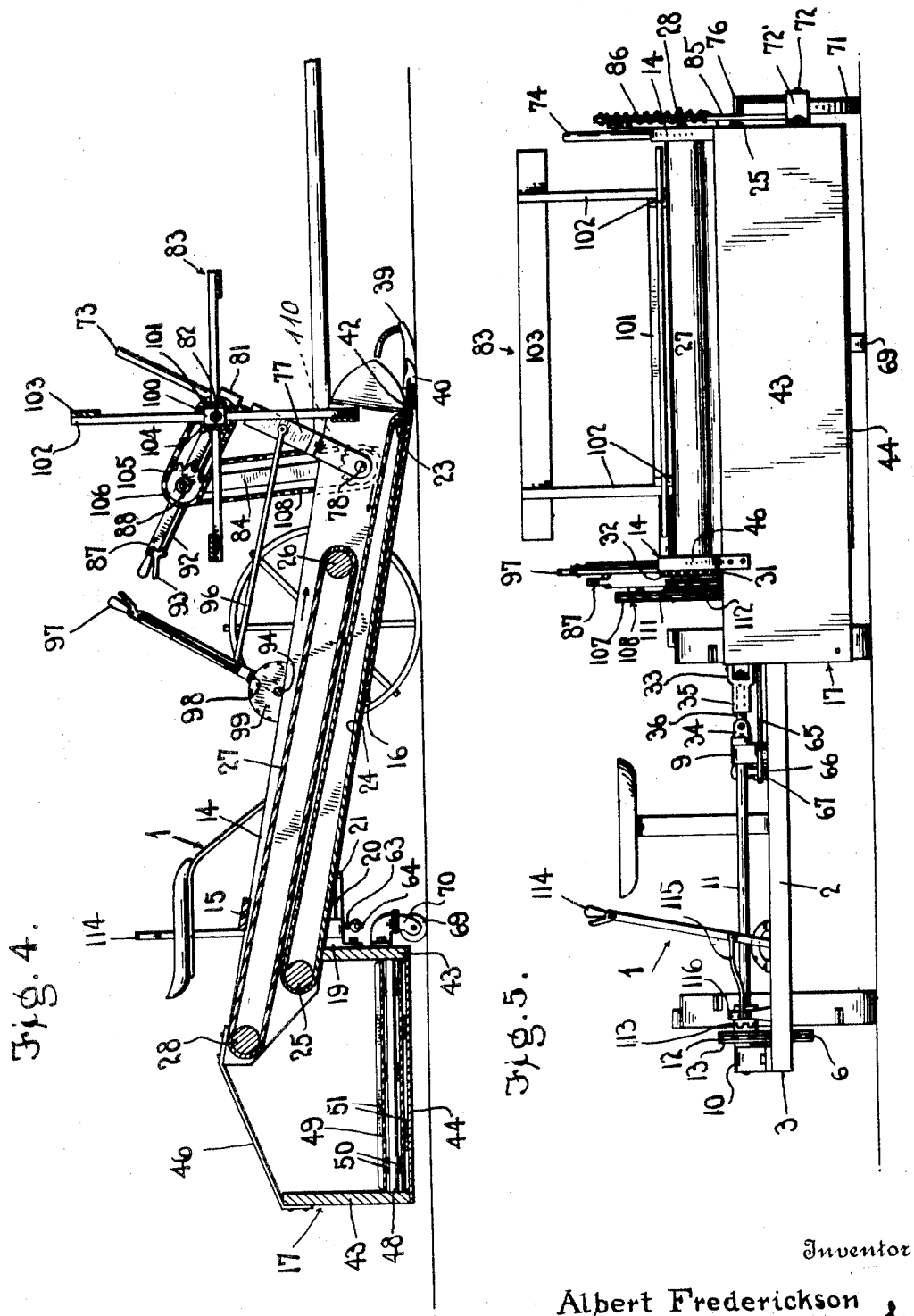

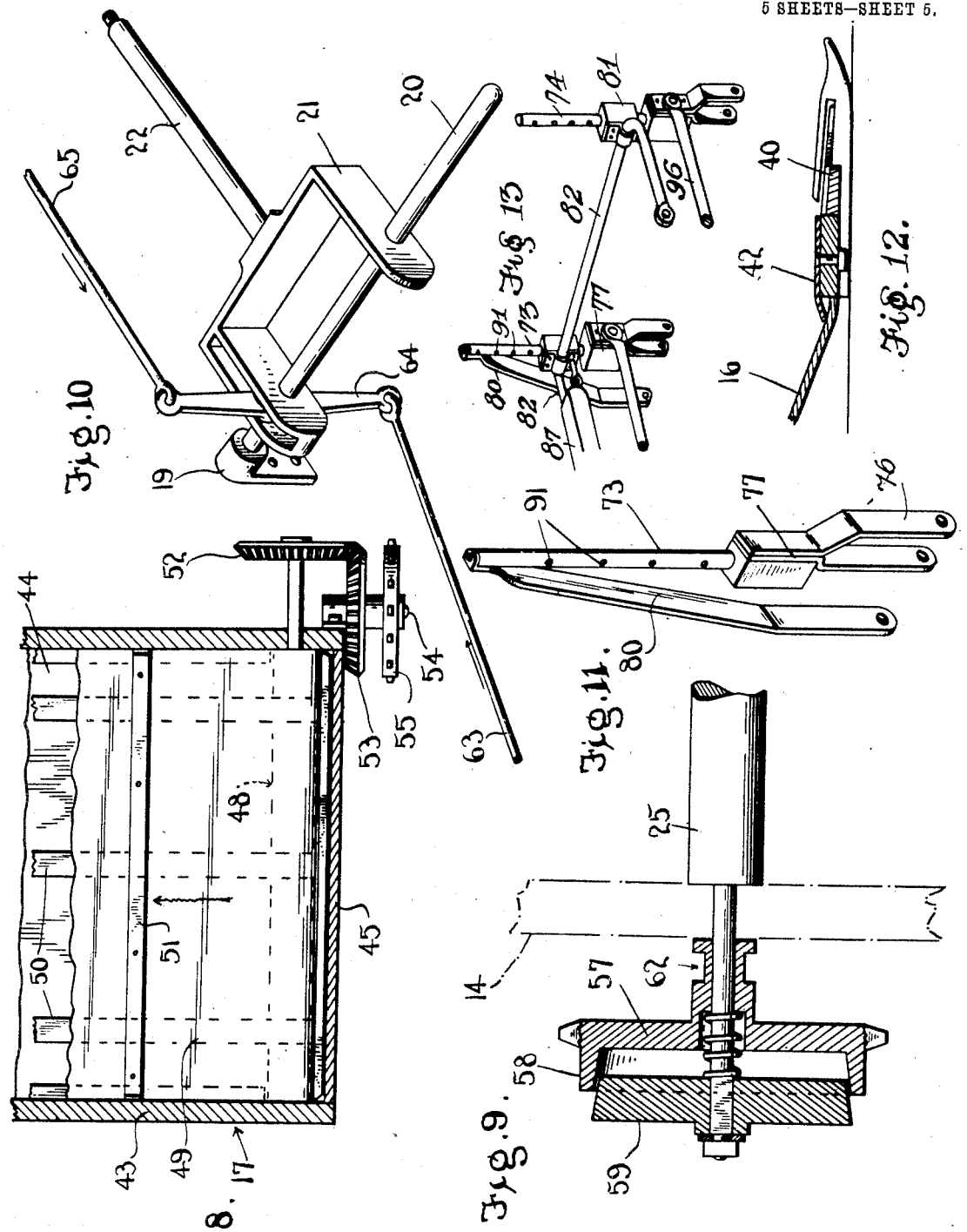

UNITED STATES PATENT OFFICE.

ALBERT FREDERICKSON AND NIELS NIELSEN, OF NEW ENGLAND, NORTH DAKOTA.

FLAX AND GRASS SEED HARVESTER ATTACHMENT FOR MOWING-MACHINES.

1,099,495. Specification of Letters Patent. Patented June 9, 1914.

Application filed July 26, 1912. Serial No. 711,763.

*To all whom it may concern:*

Be it known that we, ALBERT FREDERICKSON and NIELS NIELSEN, citizens of the United States, residing at New England, in the county of Hettinger and State of North Dakota, have invented certain new and useful Improvements in Flax and Grass Seed Harvester Attachments for Mowing-Machines; and we do declare the following to be a full, clear, and exact description of the invention, such as will enable others skilled in the art to which it appertains to make and use the same.

This invention relates to improvements in flax and grass seed harvester attachments for mowing machines.

One object of the invention is to provide an attachment of this character including a reel which may be readily applied to a mowing machine thereby converting the same into a harvester for cutting all kinds of short grass, flax, clover, alfalfa, buckwheat and the like which may be discharged continuously from the machine in windrows or in loose bunches at intervals as desired.

Another object is to provide an attachment of this character which will be simple, strong and durable in construction, efficient and reliable in operation and which is provided with a reel adapted to be adjusted forwardly, rearwardly and vertically to accommodate the same to the character of the material being cut.

With these and other objects in view, the invention consists of certain novel features of construction, and the combination and arrangement of parts as will be more fully described and claimed.

In the accompanying drawings: Figure 1 is a plan view of a mowing machine showing our improved attachment applied thereto; Fig. 2 is a side view of one side thereof; Fig. 3 is a similar view of the opposite side; Fig. 4 is a vertical longitudinal sectional view taken on the line 4—4 of Fig. 1; Fig. 5 is a rear view of the machine; Fig. 6 is an enlarged vertical cross sectional view through the elevating mechanism taken on the line 6—6 of Fig. 1; Fig. 7 is a similar view through the delivery mechanism taken on the line 7—7 of Fig. 1. Fig. 8 is an enlarged detail horizontal section through a portion of the delivery mechanism taken on the line 8—8 of Fig. 6, and illustrating more clearly the manner in which the delivery mechanism is driven; Fig. 9 is an enlarged detail sectional view through the clutch mechanism for throwing the elevating mechanism into and out of gear; Fig. 10 is a detail perspective view of the mechanism for connecting the attachment with the mowing machine; and a portion of the clutch shifting mechanism for throwing the elevator of the attachment into and out of gear; Fig. 11 is a detail perspective view of one of the reel supporting posts of the attachment; Fig. 12 is a detail vertical sectional view through the cutter bar and its supporting mechanism. Fig. 13 is a perspective view of the bail-shaped member and its adjacent parts.

Referring more particularly to the drawings, 1 denotes the mowing machine to which our improved reel attachment is applied. The mowing machine 1 may be of the usual or any suitable construction and to the axle of the same is connected a main attaching frame comprising a rear cross bar 2, an outer side bar 3 which has on its outer end a hollow bearing head 4 which is loosely engaged with the hub 5 of a sprocket gear 6 secured to the hub and spokes of the outer or left hand of the mower. To the opposite or inner end of the rear bar 2 is connected the rear end of a right hand side bar 7 the forward end of which is loosely connected with the right hand or inner end of the axle of the mowing machine as shown. Projecting forwardly from the rear bar 2 of the attaching frame is a bracket 8 to which is secured an upwardly projecting bearing standard 9, a similar standard 10 being arranged on the outer or left hand side bar of the frame as shown.

Revolubly mounted in the bearing standards 9 and 10 is a power transmitting shaft 11 on which adjacent to its outer end is mounted a sprocket gear 12. The gear 12 is connected by a sprocket chain 13 with a sprocket gear 6 on the hub of the outer wheel of the mowing machine whereby the movement of this wheel is transmitted to the shaft 11 to drive the same. The right hand side bar 7 is offset at its inner end around the right hand wheel of the mower to provide space for the attaching mechanism for the harvester to permit the latter to be attached and operated close to the mowing machine.

The harvester attachment comprises an elevator or conveyer supporting frame consisting of inclined side bars 14 connected on their upper sides adjacent to their upper ends by a cross bar 15 and at their lower ends by a plate 16 secured to the lower edges of the side bars as shown. To the rear ends of the side bars 14 of the elevator frame is connected a buncher or delivery frame 17 hereinafter described. To the inner side bar 14 of the harvester attachment is secured a laterally projecting bracket 18 while to the inner bar of the buncher frame is secured a bracket 19. In the brackets 18 and 19 is secured a longitudinally disposed attaching rod 20 with which is slidably and pivotally engaged a yoke shaped attaching frame 21 arranged on the outer end of an attaching shaft 22 which projects through the right hand side bar 7 and the bracket 8 of the main attaching frame and has its inner end secured in the bracket 8 as shown. By thus connecting the harvester attachment with the mowing machine it will be seen that the sliding pivotal connection of the yoke frame 21 with the rod 20 will permit either the harvester attachment or the mowing machine to pass over obstructions or uneven surfaces without breaking the connection. On the rod 20 between the bracket 18 and the forward end of the yoke frame 21 is arranged a coiled spring which yieldingly holds the frame in position on the rod and which will permit the harvester attachment to yield or give back when coming into engagement with an obstruction, said spring furthermore relieving the parts from jars and also relieving the draft animals of the mowing machine from side jerks and strains which would be caused by the engagement of the harvester attachment with obstructions or by passing over uneven surfaces.

Revolubly mounted in the lower ends of the side bars 14 of the harvester attachment is the lower shaft or roll 23 of a lower endless elevating apron 24 the upper portion of which is engaged with an upper supporting and operating shaft 25 which is revolubly mounted in the upper portion of the side bars 14 adjacent to their lower edges as shown. The diameter of the lower shaft should be as small as possible and said shaft should be disposed as close as possible to the lower plate 16 of the elevator frame. Revolubly mounted in the side bars 14 above the apron 24 and a short distance in rear of the shaft 23 is the front lower shaft 26 of an endless upper conveyer or elevator apron 27 the upper portion of which is operatively engaged with an upper shaft 28 revolubly mounted in the upper portion of the bars 14 as shown. Revolubly mounted on a short stub shaft 29 secured to and projecting outwardly from the inner side bar 14 of the elevator frame is a power transmitting gear 30 which is operatively engaged with a similar gear 31 fixed on the adjacent end of the upper shaft 25 of the lower apron 24 whereby this apron is driven in the proper direction. The gear 31 is also engaged with a spur gear 32 on the adjacent end of the upper shaft 28 of the upper apron 27 whereby said shaft and apron are driven in the proper direction to co-act with the lower apron for elevating the material cut by the harvester.

Connected to the hub of the power transmitting gear 30 is a universal joint 33 while to the inner end of the power transmitting shaft 11 is a universal joint 34. The joint 33 has secured thereto the socket member 35 of a sliding connection, the tongue member 36 thereof being secured to or forming part of the universal joint 34 on the end of the shaft 11. The socket member 35 is provided with a squared opening to receive the squared tongue member 36 whereby said members are slidably engaged but are prevented from turning on each other. By thus connecting the power transmitting shaft 11 with the hub of the power transmitting gear 30 it will be seen that the movement of the shaft 11 will be communicated to the gear 30 and through the latter to the gears 31 and 32 of the shafts of the upper and lower elevator of the conveyer apron whereby the latter are driven in the proper direction when the machine is drawn through the field. The universal sliding joint connection between the power transmitting shaft 11 and the gear 30 permits the mowing machine and harvester to have limited independent movements without interfering with the operation of the driving mechanism. Secured to the outer side of the lower end of the inner side bar 14 of the elevator frame is a bearing bracket 37 while to the outer side of the lower end of the outer side bar 7 of the elevator frame is secured a bearing bracket 38. To the bearing bracket 37 is hingedly connected the rear end of the inner shoe 39 of the sickle bar 40 while the outer shoe 41 of the sickle bar is pivotally connected to the bracket 38 on the outer side bar of the elevator frame. To the sickle bar 40 is connected a plate 42 which projects rearwardly and is designed to cover the space or crack between the rear edge of the sickle bar and the forward edge of the plate 16 connecting the lower ends of the side bars of the elevator frame whereby the material cut by the sickle is prevented from falling through this space.

The buncher frame 17 comprises a pair of transversely disposed side bars 43 connected at their lower edges by a bottom plate 44. The frame 17 is closed at the outer or right hand end by an end plate 45 and to the upper side of the outer bar 43 is secured an upwardly projecting guard plate 46. The inner or left hand end of the frame is open and said end extends a short distance beyond the inner side of the elevator frame as shown. Revolubly mounted in the inner ends of the side bars 43 is an inner apron supporting shaft 47 while between the opposite ends of the side bars is revolubly mounted an outer conveyer or apron supporting or operating shaft 48. It will be noted that the inner shaft 47 is somewhat smaller and is revolubly mounted in a lower plane than the outer shaft whereby the buncher or delivery apron 49 will be operated at a slight inclination toward the discharge end of the buncher frame. The apron 49 is preferably secured to a series of endless belts 50 and said apron is provided with suitable slats 51 whereby the cut material discharged onto the buncher apron by the elevating and conveying aprons will be positively carried along and discharged from the open end of the buncher frame when the shaft 48 is driven.

The driving mechanism for the buncher apron comprises a bevel gear 52 which is fixed on the inner end of the shaft 48 of the apron and which is engaged by a similar gear 53 revolubly mounted on a short stub shaft 54 secured to and projecting from the outer side of the buncher frame. On the hub of the gear 53 is arranged a sprocket gear 55 which is connected by a sprocket chain 56 with a sprocket gear 57 loosely mounted on the adjacent projecting end of the upper drive shaft 25 of the lower elevating or conveying apron 24. On the gear 57 is formed one member of a friction clutch 58 said member comprising a circular band projecting laterally from the outer side of the gear as shown. The opposing member 59 of the clutch comprises a cross bar or head having its ends rounded to fit the curved surface of the gear member of the clutch, said ends of the bar being tapered or inclined inwardly to a slight extent as shown. By thus constructing the clutch connection between the gear 57 and the shaft 25 it will be seen that when said gear and its clutch member are shifted outwardly, said clutch member will be brought into operative engagement with the clutch member on the shaft thereby locking the gear 57 to the shaft. When the gear is thus locked to the shaft the movement thereof is imparted through the chain 56, sprocket gear 55 and bevel gears 53 and 52 to the shaft of the buncher apron whereby the latter is driven. The gear 57 is shifted inwardly to normally hold the clutch member thereon out of operative engagement with the clutch member on the shaft by a coiled spring arranged between the gear and the outer side of the adjacent side bar of the elevating frame. When the clutch members are engaged the buncher mechanism will be continuously driven to discharge the material in windrows.

In order to engage the clutch members to permit the material to be delivered continuous in windrows we provide a suitable clutch shifting mechanism comprising a lever 60 which is pivotally connected to a bracket 61 on the outer side of the adjacent side bar of the frame and which is provided with a forked outer end engaged with an annular groove 62 in the hub of the sprocket gear 57 whereby when the lever is operated in the proper direction the gear together with the clutch member thereon will be retracted and disengaged from the clutch member on the shaft 25 thereby throwing the bunching mechanism out of gear. The free end of the lever 60 is connected by a rod 63 to the lower end of a rocker bar 64 pivoted on the attaching rod 20. The upper end of the rocker bar 64 is connected by a short rod 65 to one arm of a bell crank lever 66 pivoted on the bracket 8 on the rear bar 1 of the attaching frame. The opposite arm of the bell crank lever 66 is connected by a rod 67 with a foot lever 68 also pivotally mounted on the bracket 8 within convenient reach of the foot of the driver or operator whereby the same may be shifted to engage the clutch members of the bunching mechanism so that the latter may be stopped and started at will, thus providing a continuous or periodical delivery of the material discharged to the bunching mechanism as hereinbefore described.

The rear portion of the harvester attachment is supported by a single caster or swiveled wheel 69 which is pivotally mounted in a suitable bearing bracket 70 secured to the outer side of the forward side bar of the buncher mechanism substantially midway between the sides of the harvester attachment whereby the latter is supported and balanced on the caster wheel. The forward end of the attachment is suitably supported at the outer side of the same by a supporting wheel 71 which is revolubly mounted on a short stub shaft 72 arranged in the lower portion of the outer side bar of the elevator frame, said shaft having its outer end revolubly mounted in a bearing plate 72 secured to the outer side bars of the frame over the wheel 71 as shown. Our attachment also includes a reel mounted on standards 73 and 74. The outer standard 74 has secured to its lower end attaching plates 75 which are disposed on opposite sides of the outer side bar 14 and are pivotally mounted on the shaft 72 of the supporting wheel 71. The standard 74 is further connected to the shaft 72 and braced by an outer bracing plate 76 passing over the wheel 71 as shown. The lower end of the standard 73 has secured thereto attaching plates 77 which are pivotally connected with a stub shaft 78 mounted in the inner side bar 14 and in a bearing bracket 79 secured to said side bar as shown. The shaft 78 is disposed in line with the shaft 72 to which the standard 74 is connected. The standard 73 is further braced and connected to the shaft 78 by a brace bar 80 the lower end of which is pivotally connected to the outer end of the shaft while the upper end thereof is connected to the upper end of the standard as shown.

Slidably mounted on the standards 73 and 74 are reel supporting boxes 81 in which is mounted the body portion of a bail shaped reel member 82 on whose body portion between the boxes 81 and the standards 73 and 74 is journaled a reel 83. The arms of the member extend to the rear and are pivotally connected to the upper ends of inner and outer fulcrum bars 84 and 85. The outer arm projects a short distance beyond its connection with the bar 85 and is connected by a coiled spring 86 with the lower portion of the bar 85 for a purpose hereinafter described. The inner arm of the bail shaped member 82 is extended into or has secured thereto a rearwardly projecting lever 87. This arm rocks on a counter shaft 88 revolubly mounted in the upper end of the inner fulcrum bar 84 and in a parallel bearing plate 89 secured to said bar as shown. By thus supporting the reel on the standards 73 and 74 and providing the lever 87 it will be seen that the boxes 81 together with the shaft 82 and the reel may be raised and lowered to the desired elevation on the standards 73 and 74 to bring the blades of the reel into proper position for engaging the grass or other material being cut. In order to support the reel at the desired elevation we provide a locking pin 90 which is mounted in a transverse passage in the box 81 of the standard 73 and which is adapted to be projected and retracted in the box to engage and disengage the end thereof with and from a series of pin holes or sockets 91 formed in the rear side of the standard 73. The pin 90 is connected by an operating rod 92 with a bell crank lever 93 pivoted in the outer end of the lever 87 as shown.

The reel supporting standards 73 and 74 are adapted to be swung forwardly and rearwardly to adjust the reel in this direction by means of a rock shaft 94 which is mounted in suitable bearings on the upper edges of the side bars 14 of the elevator frame and which has on its ends upwardly projecting crank arms 95 connected by links 96 to the standards 73 and 74 whereby when the shaft is rocked forwardly or rearwardly the standards and reel will be shifted in a corresponding direction. To the crank arm 95 on one end of the shaft 94 is secured an upwardly projecting operating lever 97 provided with a pawl 98 adapted to be engaged with a segmental rack 99 whereby the lever may be locked to hold the reel in the position to which the same has been adjusted. The reel 83 comprises bearing sleeves or hubs 100 revolubly mounted on the body portion of the member 82 and having squared inner ends which are connected by parallel bars or plates 101. On the hubs 100 are fixed a series of radially projecting arms 102 connected at their outer ends by blades or paddles 103. Any suitable number of arms and blades may be provided. The reel when thus constructed is revolved at the proper speed and in the proper direction by a sprocket gear 104 which is fixedly connected by a chain 105 to a sprocket gear 106 fixed on one end of the counter shaft 88 on the opposite end of which is fixed a sprocket gear 107 connected by a sprocket chain 108 with a sprocket gear 109 loosely mounted on the stub shaft 78. Integral with or fixed to the gear 109 is a second sprocket gear 110 which is connected by a sprocket chain 111 to a sprocket gear 112 formed integral with or fixed to the driving gear 32 of the upper shaft 28 of the upper elevator or conveyer apron 27. By thus connecting the reel with the gear 32 it will be seen that the reel will be driven in the proper direction from the power transmitting shaft which is operatively connected with the gear 32 as hereinbefore described.

The sickle bar 40 is connected to the mowing machine and operated by the usual or any suitable connecting and driving mechanism. The inner shoe 39 of the sickle bar is the same as employed in the mowing machine. The usual outer shoe of the sickle bar or cutting mechanism is, however, preferably removed and the straight shoe 41 is connected to the outer end of the sickle bar supporting mechanism as shown.

By constructing and arranging our improved attachment as herein shown and described it will be seen that no matter how short the grass or other material to be cut may be the attachment will effectually cut and convey the same to the bunching mechanism from which it may be continuously discharged in a windrow or periodically discharged in loose bunches as hereinbefore described. By providing the reel and elevating or conveying mechanism as herein shown and described the grass or other material may be cut in very windy weather without danger of being blown from the machine and wasted, and the material when cut is carried directly back from the cutting mechanism thus obviating any possibility of the material accumulating and clogging or interfering with the operation of the cutting mechanism.

The gear 12 is loosely mounted on the power transmitting shaft 11 and is adapted to be locked thereto by a clutch 113, one member of which is formed on the gear and the other member thereof slidably keyed to the shaft and adapted to be shifted into and out of engagement with the member on the gear by a clutch shifting lever 114 suitably pivoted to the frame of the machine and connected to the clutch member by a link 115 and a pivoted shifting bar 116 as shown.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described our invention, what we claim is;

1. The herein described attachment for mowing machines comprising pivots in the machine frame, standards mounted at their lower ends on said pivots, means for swinging the standards forward and backward in unison, fulcrum bars supported on the said pivots, boxes slidably mounted on said standards, a bail-shaped reel supporting member whose body portion is loosely connected with said boxes and whose arms extend to the rear and are pivotally connected with said fulcrum bars, a handle on the rear extremity of one arm for raising and lowering the body portion of said reel supporting member, a spring connecting the rear extremity of the other arm with the fulcrum bar to which this arm is pivoted, a reel revolubly mounted on said body portion, and means for rotating the reel.

2. The herein described attachment for mowing machines comprising alined stub shafts in the machine frame, standards mounted at their lower ends on said shafts, means for swinging the standards forward and backward in unison, fulcrum bars supported on the same shafts, boxes slidably mounted on said standards, a bail-shaped reel supporting member whose body portion is loosely connected with said boxes and whose arms extend to the rear and are pivotally connected with said fulcrum bars, a handle on one arm for raising and lowering the body portion of said reel supporting member, a reel revolubly mounted on said body portion, a sprocket wheel on the reel shaft, connected sprocket wheels on the pivotal shaft which passes through one fulcrum bar and one arm of said reel supporting member, a driving sprocket on the stub shaft supporting said fulcrum bar, a chain connecting the driving sprocket with one of those on said pivotal shaft, and a second chain connecting the other sprocket on said pivotal shaft with that on said reel, for the purpose set forth.

3. The herein described attachment for mowing machines comprising standards pivotally mounted at their lower ends on stub shafts in the side bars of the machine, a rock shaft mounted in bearings on said side bars, crank arms on said shaft connected with said standards, an operating lever projecting from said shaft, fulcrum bars supported on the said stub shafts, boxes slidably mounted on said standards, a bail-shaped reel supporting member whose body portion is pivotally connected with said blocks and whose arms extend to the rear and are pivotally connected with said fulcrum bars, a handle on one arm for raising and lowering the body portion of said reel supporting member, a reel revolubly mounted on said body portion, and means for rotating the reel.

In testimony whereof we have hereunto set our hands in presence of two subscribing witnesses.

ALBERT FREDERICKSON.
NIELS NIELSEN.

Witnesses:
JOHN A. BOHNHOFF,
HENRY MELAAS.